June 16, 1959
E. A. WERDER
2,890,716
CONTROL DEVICE
Filed March 16, 1956
3 Sheets-Sheet 3
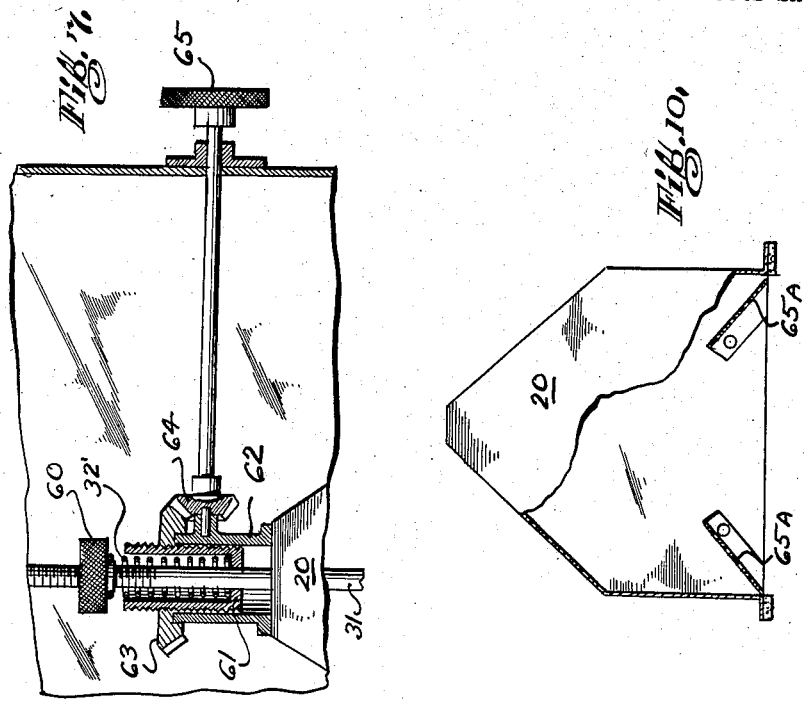
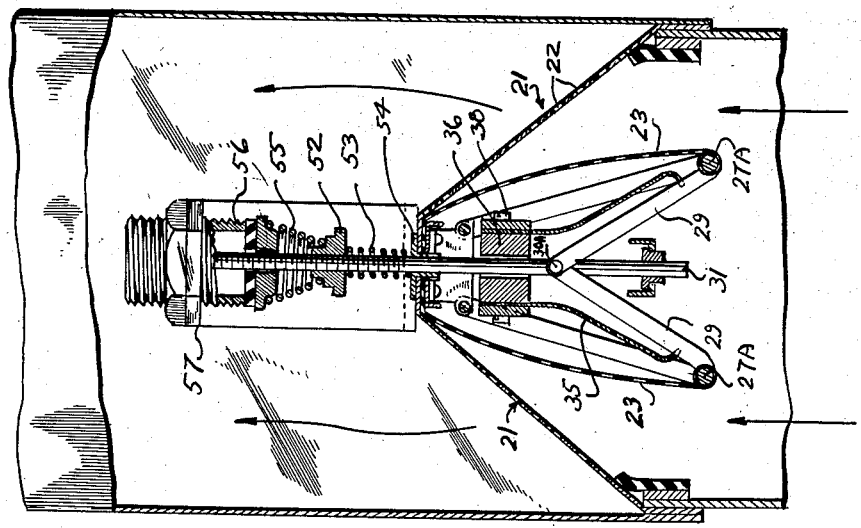
INVENTOR
ERNEST A. WERDER
BY
Pollard Johnston Smythe Robertson
ATTORNEYS.

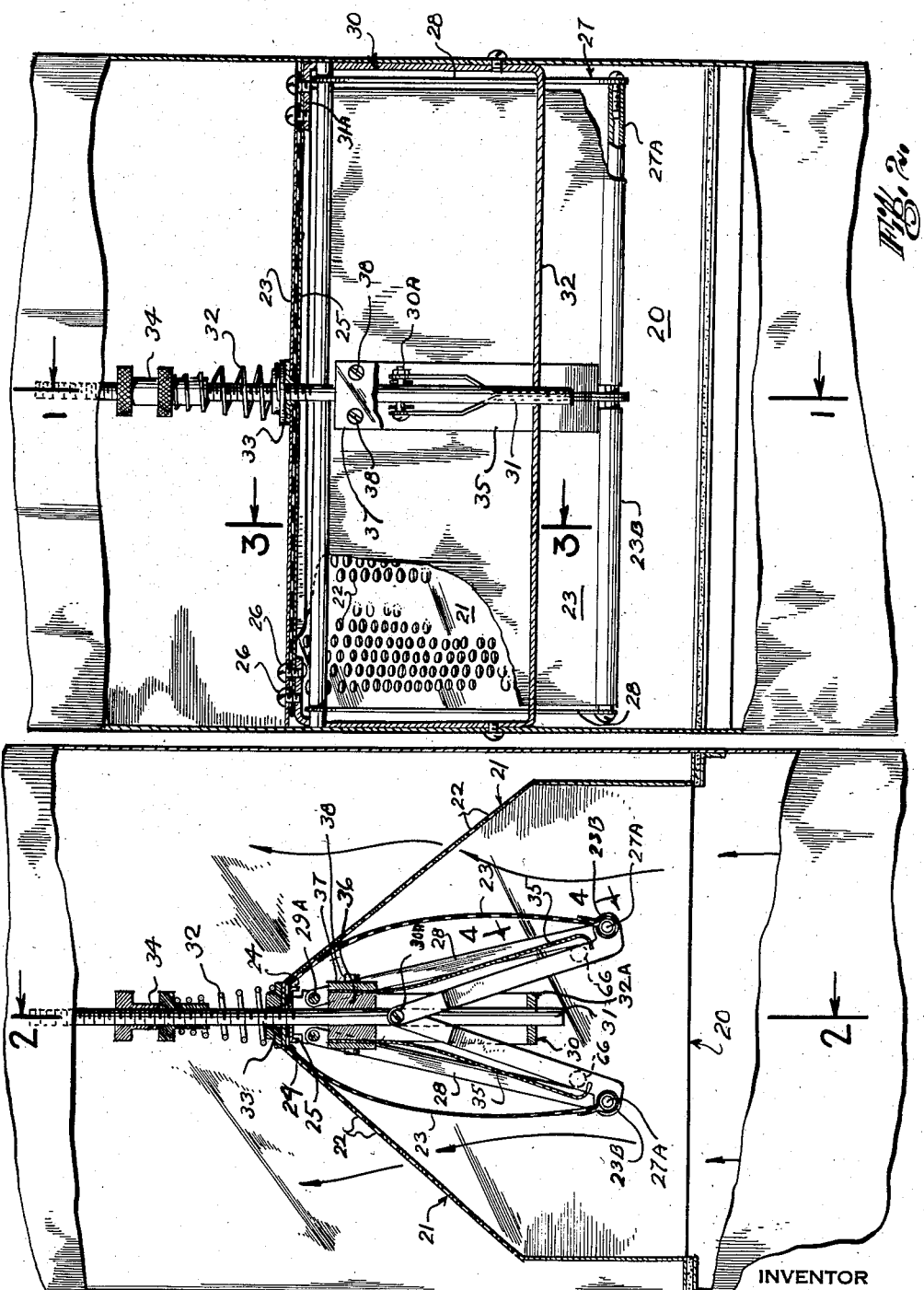

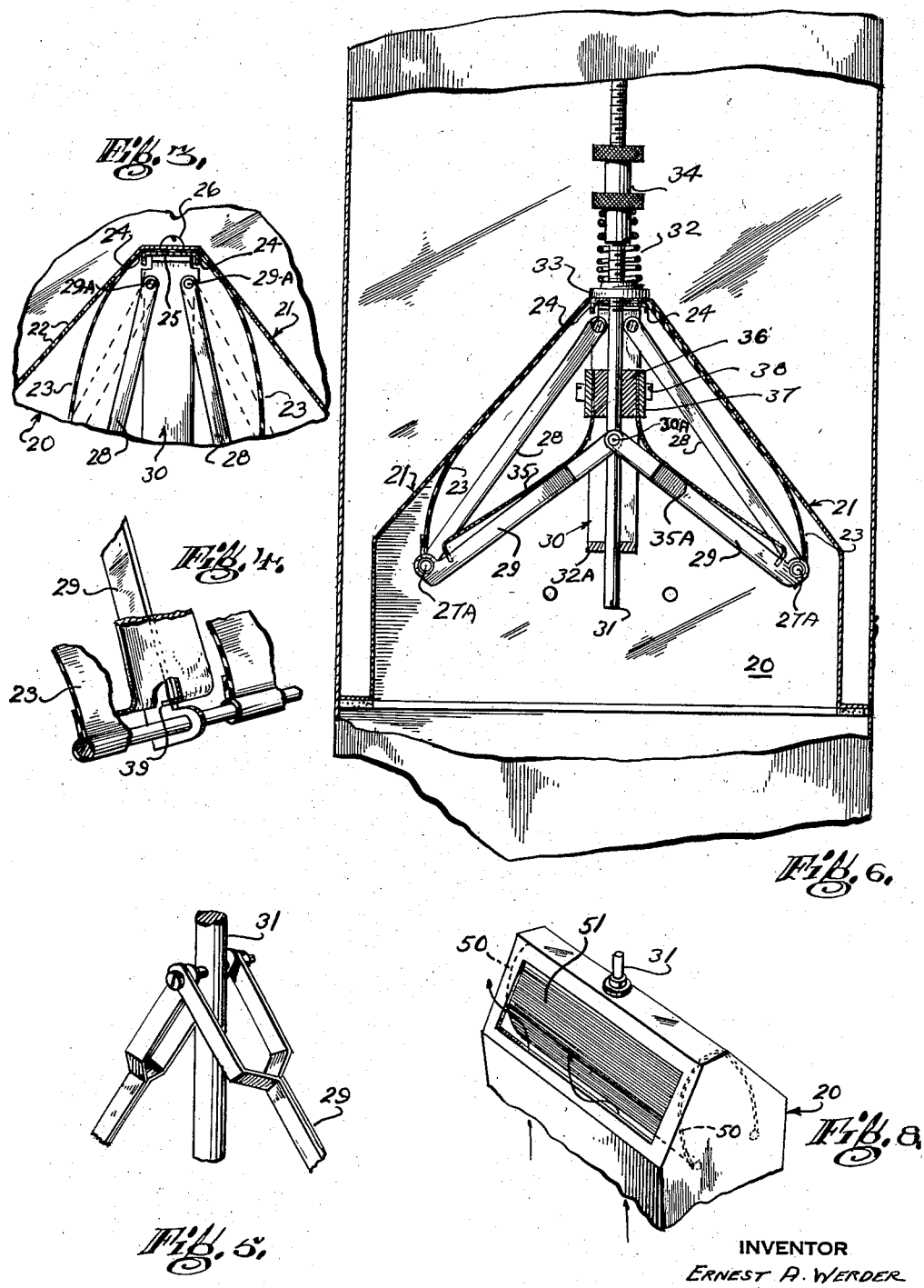

United States Patent Office 2,890,716
Patented June 16, 1959

2,890,716

CONTROL DEVICE

Ernest A. Werder, Rego Park, N.Y., assignor to Buensod-Stacey, Incorporated, New York, N.Y., a corporation of Delaware Application March 16, 1956, Serial No. 571,986

18 Claims. (Cl. 137—512.15)

This invention relates to fluid flow control devices and particularly to an arrangement for maintaining constant the volume of air flowing through a passage or duct such as the air delivery ducts from central air conditioning systems.

In air conditioning systems where air is supplied from a central conditioning device to a plurality of individual distributing units, changing demands for air in the rooms or zones will cause pressure variations in the air delivery lines with resultant variations in volume flowing therethrough. As an example, where dual duct systems are involved, particularly those operating at high pressures such as described in Patent No. 2,708,568, flow in the warm and cold air ducts may vary over wide ranges in response to demands and such may result in wide variations in pressure in the ducts. Variations in pressure will cause objectionable changes in air distribution, noises, and other undesirable effects, unless the flow is controlled.

One of the objects of the present invention is to provide an improved volume or flow control device responding to upstream pressures for maintaining with stability the flow of fluid or air throughout the system as designed or as adjusted for best results.

In one form of the invention, the device may comprise swingable flexible curtain means movable in the path of flow through the device, the device being suitably placed in the flow of fluid to be controlled, such as air, the curtains being operated by air flow such being responsive directly to upstream pressures. Cooperating with said curtain means is a motion limiting means having fluid passage means therethrough, the relative position of the curtain and passage means controlling the volume of fluid passing through the device. The motion limiting means, which in effect acts as a valve seat for the flexible curtain, may be a plate having a plurality of apertures therein or any suitable screen-like structure. For example, it may consist of bars or abutments extending across the passage in various manners against which the curtain can move. Also, the fluid passage means or opening may be unimpeded and there may be ribs in the curtain itself engaging margins of the aperture of the opening for limiting motion of the curtain outward through the opening. The flexible curtain means can be supported so that it will swing or hinge about an axis, the edge or portion of the curtain spaced from the hinge axis being substantially parallel with and spaced from said axis, said spaced edge or portion being guided or carried by a movement stabilizing means which will guide the swinging movement of the curtain so that it will move in a predetermined manner. The curtain will roll onto the motion limiting means or will peel off. As the curtain rolls down the motion limiting means, the effective hinge axis thereof changes. The movement stabilizing means may include a swingable frame means pivoted about an axis or hinge spaced from the axis of swing of the curtain means. Said axes are arranged relatively to each other so that the curtain is in a relatively stretched-like condition when the fluid passage is open and progressively becomes less stretched or extended as the curtain moves to close the fluid passage. Such will permit the curtain to close progressively against the motion limiting means and thus control the fluid passage through the device.

The swingable stabilizing frame means may have arm means attached thereto for connecting movement resisting means to the swingable frame so that as the swingable frame moves with the curtain toward a fluid flow closing position, a resisting force will be applied thereto. The resisting force may include spring means acting on a reciprocable mechanism or rod means connected to the arm means. A second or auxiliary spring acting directly on a swingable frame means also can be provided, the swingable frame spring also moving with the reciprocable mechanism. It should be apparent that the spring means acting on the reciprocable rod can take various forms and can be adjustable.

In a preferred form, the control device includes a main housing or casing having a pair of fluid passages, each as just described, with a flexible curtain for each with their respective swingable stabilizing frames movable toward and away from each other for opening and closing said passages. As the flow or pressure tends to increase on the upstream side of the device, the curtains and their frames will be thrust toward the motion limiting means to reduce flow through the passages.

In a further aspect, the casing means can have baffles, which may be perforated, to distribute air evenly to the curtains and through the passages.

These and other objects, advantages and features of the invention will become apparent from the following description and drawings, which are merely exemplary.

In the drawings:

Fig. 1 is a sectional side view through a duct or passage having a control device embodying the present invention, the section being taken generally in the direction 1—1 of Fig. 2.

Fig. 2 is a front view of the control device of Fig. 1 with parts thereof broken away, the view being taken in the general direction of line 2—2 of Fig. 1.

Fig. 3 is a fragmentary view taken in the direction of line 3—3 of Fig. 2.

Fig. 4 is a fragmentary enlarged perspective view taken in the general direction of line 4—4 of Fig. 1.

Fig. 5 is a fragmentary perspective view showing the connection of the equalizing arms to the reciprocable resisting mechanism rod.

Fig. 6 is a view generally similar to Fig. 1 showing the swingable members and curtains moved to position closing off a substantial part of the air passage as compared with Fig. 1.

Fig. 7 is a fragmentary view showing the modified arrangement providing for adjustment of the spring or resisting mechanism from the outside of the duct or passage.

Fig. 8 is a reduced size fragmentary perspective view showing another form of the invention wherein the air passages are unimpeded.

Fig. 9 is a side view in section of another form of resisting mechanism spring arrangement.

Fig. 10 is a fragmentary view of a casing showing baffles which can be employed.

The device will be described in conjunction with its use in an air conditioning duct or passage and wherein there are two swingable curtains controlling passage of air through two adjacent air passages through the device. It is to be understood, however, that it is possible to use only one curtain controlling a single air passage means and that it can be placed at varying positions and angles in the duct or air flow to be controlled. Also, the duct may be vertical, horizontal, or arranged at any desired angle.

Referring to Fig. 1, the main housing 20 has motion limiting means 21, 21, each having air passage means therethrough. Said passage means in the form shown comprises a plurality of apertures 22 through which the air passes when not blocked or closed off by swingable flexible means or curtains 23. Curtains 23 are fastened at 24, 24 between the main housing 20 (Figs. 1, 3) and a suitable clamp means 25, said clamp means being in the form of a C-shaped strip fastened to the main housing 20 by means of screws 26. Thus, the curtains will swing about an axis or hinge line 24, 24 adjacent to the edges of clamp 25. The flexible curtains 23, 23 may be made in one piece as illustrated, or may be separated in two pieces.

The swingable edge 23B of the curtain, which is spaced from the hinge axis, is guided in its movement by the swingable stabilizing frame or arm means shown generally at 27. The stabilizing frame may include longitudinally extending rod 27A, which in turn is attached to radius arms 28, said radius arms being pivotally mounted at 29A to bracket 30 or to the main housing. Bracket 30 has turned-over ends 31A and it may extend downwardly and have a crossbar 32A, crossbar 32A providing a support or guide for the reciprocating rod movement resisting mechanism, as will be described later. The longitudinally extending rod 27A and radius rods 28 provide a swingable frame for controlling movement of the curtain as the curtain swings toward and away from the air passage motion limiting plates 22. This frame can be constructed in various manners.

The length of radius arms 28 is shorter than the distance from the hinge axis 24 of the swingable flexible means 23 to the longitudinally extending rod 27A. Thus, when the swingable curtains are in the position shown in Fig. 1, the curtains will be relatively stretched or flattened out as compared with the condition that exists when the radius rods are swung outwardly as in Fig. 6. As a result of this swinging movement and the offset of the pivots or hinges, the slack will increase in the curtain as the frame means is swung toward flow decreasing position so as to permit the curtain to be carried progressively against the air passage means through the limiting means. The radius (29A to 27A) of the arcuate path of 27A is shorter than the radius (24 to 27A) of the arcuate path of curtain 23.

Arms 29, which may be termed equalizing arms, are pivotally mounted at one end to the center of the longitudinally extending rod 27A and adjacent the other end are pivotally mounted at 30A to the reciprocable movement resisting rod 31. As can be seen in Fig. 5, the upper ends of the equalizing arms 29, 29 can be bifurcated or suitably arranged so as to straddle the movement resisting rod 31. Reciprocable rod 31 has spring means 32 which can be mounted at one end on housing 20 through member 33 and with its opposite end contacting adjustable abutment 34, said adjustable abutment being screw-threadedly mounted on rod 31. Spring 32 is arranged to urge the rod upwardly so as to tend to cause the curtains to be moved toward each other and thus cause the air passages to be in their fully open position.

Springs 35, 35, which may be of the leaf or any suitable type, may have one end thereof fastened to anchor block 36 by means of plates 37 and screws 38, spring anchor 36 being mounted on reciprocable rod 31 and slideable relative thereto. The outer end of the leaf spring may be fastened to the swingable frame by being bent over or shaped as seen in Fig. 4 so as to fit into slot 39 in equalizing arm 29 but can be fastened thereto in other manners. The stabilizing frame or auxiliary springs 35 can be shaped so that when in the fluid flow open position (Fig. 1), the entire length of the spring is effective and so that as the frames move apart, the spring will bend downwardly and engage the equalizing rod at an intermediate point such as 35A in Fig. 6. It is to be understood that the springs can be given various shapes and characteristics as needed. The arms 29, 29, reciprocable rod 31 and the springs 35 combine to form a balancing means which eliminates any flutter of the curtain 23 when it rolls onto the motion limiting means in response to the pressure on the upstream side of the curtain.

As previously mentioned, the air passage means in the motion limiting means or the valve seat can take various forms, such as bars across the opening or various types of screens (not shown). Also, the air passage means can be arranged as seen in Fig. 8, wherein the margins 50 of the curtain perpendicular to the hinge axis are dimensioned to engage the inside margins of the aperture, the curtain 51 having sufficient longitudinal strength so as to close off the air passage progressively.

In place of the single spring 32 of Fig. 1, two opposing springs as seen in Fig. 9 can be arranged to exert a force upon the spring rod. Where appropriate, similar parts to those in Figs. 1 to 6 are given the same reference numerals in Fig. 9. In the arrangement of Fig. 9, spring rod 31 can have an adjustable nut or abutment 52 with a spring 53 between one face thereof and the bushing 54 on casing 20. A second spring 55 can be located between the upper face of nut 52 and the adjustable element 56, adjustable element 56 being carried in bracket 57 mounted on casing 20. The type and character of the springs can be selected to produce the desired result and they can be adjusted relative to each other as needed by adjustable elements or abutments 52 and 56.

One manner of adjusting the spring tension of spring 32' is illustrated in Fig. 7, wherein spring 32' is carried between adjustable abutments 60 and 61. The adjustable abutment 61 is suitably keyed (not shown) to bushing 62 so that it will not turn as gear 63 is turned by gear 64, gear 64 being rotatable by adjusting knob 65 located exteriorly of the duct or passage. Adjustable nut 60 can be turned to make the initial adjustment and then the movement resisting force adjusted by turning knob 65.

In some instances, it has been found desirable to provide baffles at the entrance of the control device so as to distribute the air uniformly therein. One example thereof is seen in Fig. 10, wherein perforated plates 65A, 65A are located at the lower part of casing 20, said plates extending across the casing. The casing 20 in other respects will have the same control mechanism as described for the other forms.

If desired, stops 66 can be provided to limit movement of the radius arms toward each other. If the stops are not provided, bracket 30 will serve to limit the movement. The radius arms can be hingedly mounted to the frame by the pivots illustrated or by flat springs (not shown). Also, a bypass slot (not shown) can be provided in the side walls of the casing 20.

It is to be understood that various details of construction and arrangement of parts can be made without departing from the spirit of the invention except as defined in the appended claims.

What is claimed is:

1. A device for controlling fluid flow in an air conditioning passage or the like, said device having a path of flow therethrough, comprising swingable flexible means movable in said path of flow, motion limiting means for said flexible means in said path of flow, said limiting means having air passage means therethrough, said flexible means and limiting means cooperating with each other to control the flow of fluid through said limiting means, balancing means connected to said flexible means, and movement stabilizing means connected to said flexible means for guiding the swinging movement of said flexible means toward and away from said motion limiting means, said flexible means and stabilizing means being moved by changes in upstream pressure.

2. A device for controlling fluid flow in an air conditioning passage or the like, said device having a path of flow therethrough, comprising a swingable flexible curtain means movable in said path of flow, said curtain means being swingable about an axis, motion limiting means for said curtain means against which said curtain means rolls, said limiting means having air passage means therethrough and cooperating with said curtain means to control flow of air, balancing means connected to said flexible means, and swingable movement stabilizing arm means connected to said curtain means, said arm means being swingable about an axis spaced from the axis of said curtain means for guiding the rolling action of said flexible means toward and away from said motion limiting means in a predetermined path, movement of said curtain and stabilizing means being responsive to pressure on the upstream side thereof.

3. A device for controlling fluid flow in an air conditioning passage or the like, said device having a path of flow therethrough, comprising a pair of swingable flexible means movable in said path of flow, motion limiting means for each of said flexible means in said path of flow, each of said limiting means having air passage means therethrough, said flexible means and limiting means cooperating with each other to control the flow of air through said limiting means, balancing means connected to said flexible means, and movement stabilizing arm means connected to each of said flexible means for guiding the swinging movement of each of said flexible means toward and away from said motion limiting means to control the passage of air therethrough, movement of said flexible means being dependent upon air pressure on the upstream side thereof.

4. A device for controlling fluid flow in an air conditioning passage or the like, said device having a path of flow therethrough, comprising swingable flexible curtain means movable in said path of flow, said curtain means being swingable about a hinge axis, motion limiting means for said curtain means, said limiting means having air passage means therethrough cooperating with said curtain means to control flow of air therethrough, swingable movement stabilizing arm means connected to said curtain means, said arm means being swingable about a hinge axis spaced from the hinge axis of said curtain means for guiding the swinging action of said flexible means toward and away from said motion limiting means in a predetermined path, balancing means connected to said flexible means and movement resisting means connected to said stabilizing frame means, movement of said curtain means being responsive to pressure on the upstream side thereof.

5. A device for controlling fluid flow in an air conditioning passage or the like, said device having a path of flow therethrough, comprising swingable flexible curtain means movable in said path of flow, said curtain means being swingable about a hinge axis, motion limiting means for said curtain means, said limiting means having air passage means therethrough, said curtain and limiting means cooperating to control flow therethrough, swingable movement stabilizing arm means connected to said curtain means, said arm means being swingable about a hinge axis spaced from the hinge axis of said curtain means for guiding the swinging action of said flexible means toward and away from said motion limiting means, and at least two spring means connected to said stabilizing frame means tending to urge said frame means and curtain toward air passage means open position, said flexible means being moved by changes in upstream pressure thereon.

6. A device for controlling fluid flow in an air conditioning passage or the like, said device having a path of flow therethrough comprising swingable flexible curtain means movable in said path of flow, said curtain means being swingable about a hinge axis, motion limiting means for said curtain means, said limiting means having air passage means therethrough, said curtain means and limiting means cooperating to control flow, swingable movement stabilizing arm means connected to said curtain means, said arm means being swingable about a hinge axis spaced from the hinge axis of said curtain means for guiding the swinging action of said flexible means toward and away from said motion limiting means, reciprocable rod means connected to said arm means, equalizing arm means connected to said rod means and to said stabilizing arm means, and force exerting means connected to said rod means urging said frame means in a direction to open said air passage means, said curtain means being moved by changes in upstream pressure thereon.

7. A device for controlling fluid flow in an air conditioning passage or the like, said device having a path of flow therethrough, comprising swingable flexible curtain means movable in said path of flow, said curtain means being swingable about a hinge axis, motion limiting means for said curtain means, said limiting means having air passage means therethrough, said curtain and limiting means cooperating to control flow therethrough, swingable movement stabilizing arm means connected to said curtain means, said arm means being swingable about a hinge axis spaced from the hinge axis of said curtain means for guiding the swinging action of said flexible means toward and away from said motion limiting means, reciprocable rod means connected to said arm means, equalizing arm means connected to said rod means and to said stabilizing arm means, force exerting means connected to said rod urging said frame means in a direction to open said air passage means, and second force exerting means acting directly on said stabilizing arm means urging said frame means in a direction to open said air passage means, increase of upstream air pressure operating to close said path of flow.

8. A device for controlling fluid flow in an air conditioning passage or the like, said device having a path of flow therethrough comprising swingable flexible curtain means movable in said path of flow, said curtain means being swingable about a hinge axis, motion limiting means for said curtain means, said limiting means having air passage means therethrough, said curtain and limiting means cooperating to control flow therethrough, swingable movement stabilizing arm means connected to said curtain means, said arm means being swingable about a hinge axis spaced from the hinge axis of said curtain means for guiding the swinging action of said flexible means toward and away from said motion limiting means, reciprocable rod means, equalizing arm means connected to said rod means and to said stabilizing arm means, force exerting means connected to said rod urging said arm means in a direction to open said air passage means, block means slidably mounted on said reciprocable rod means and spring means connected to said stabilizing arm means and to said block means urging said arm means in a direction to open said air passage means, changes in upstream air pressure operating said curtain means.

9. A device for controlling fluid flow in an air conditioning passage or the like, said device having a path of flow therethrough, comprising a pair of swingable flexible means movable in said path of flow, motion limiting means for each of said flexible means, each of said limiting means having air pasasge means therethrough, said flexible means and limiting means cooperating to control the flow of air, movement stabilizing arm means connected to each of said flexible means for guiding the swinging movement of each of said flexible means toward and away from said motion limiting means to control the passage of air therethrough, reciprocable rod means, resisting means engaging said reciprocable rod means and resisting its movement, equalizing arm means connected to each of said frame means and to said reciprocable rod means, and spring means connected to said reciprocable rod means exerting force thereon to tend to open said air passage means, changes in upstream air pressure operating said flexible means.

10. A device for controlling fluid flow in an air conditioning passage or the like, said device having a path of flow therethrough, comprising a pair of swingable flexible means movable in the path of flow through said device, motion limiting means for each of said flexible means, each of said limiting means having air passage means therethrough, said flexible means and limiting means cooperating to control the flow of fluid, movement stabilizing arm means connected to each of said flexible means for guiding the swinging movement of each of said flexible means toward and away from said motion limiting means to control the passage of air therethrough, and spring means connected to said arm means urging said arm means and its respective flexible means in a direction to open said air passage means, changes in upstream air pressure operating said flexible means.

11. A device for controlling fluid flow in an air conditioning passage or the like, said device having a path of flow therethrough comprising a pair of swingable flexible means movable in said path of flow, motion limiting means for each of said flexible means, each of said limiting means having air passage means therethrough, said flexible means and limiting means cooperating to control the flow of fluid, movement stabilizing arm means connected to each of said flexible means for guiding the swinging movement of each of said flexible means toward and way from said motion limiting means to control the passage of air therethrough, reciprocable rod means, reciprocable rod means movement resisting means between said flexible means, equalizing arm means connected to each of said arm means and to said reciprocable rod means, spring means connected to said reciprocable rod means exerting force thereon to tend to open said air passage means, and spring means connected to said arm means urging said arm means and its respective flexible means in a direction to open said air passage means, changes in upstream air pressure operating said flexible means.

12. A device for controlling flow in an air conditioning passage or the like, said device having a path of flow therethrough comprising a main support means, swingable flexible curtain means movable in said path of flow, said curtain means being hingedly mounted on said main support means and being swingable about an axis, motion limiting means having air passage means therethrough, said curtain and limiting means cooperating to control flow therethrough, balancing means connected to said curtain means, and swingable movement stabilizing arm means connected to said curtain means, said arm means being hingedly mounted on said main support means on an axis offset from the axis of said curtain means, said arm means guiding the swinging action of said flexible means toward and away from said motion limiting means, the radius of arcuate movement of said arm means where attached to the curtain being made less than the distance between the axis about which said curtain means is hinged and the connection of said curtain means to said arm means, so that said curtain means will progressively close said air passage means as the curtain means moves toward said motion limiting means, said curtain means being moved by changes in upstream pressure.

13. A device for controlling fluid flow in an air conditioning passage or the like, said device having a path of flow therethrough comprising swingable flexible means movable in said path of flow, motion limiting means for said flexible means on the downstream side of said flexible means, said limiting means comprising a perforated plate through which air can pass, said flexible means rolling into said limiting means and peeling off therefrom to control the flow of fluid through said limiting means, balancing means connected to said flexible means, and swingable movement stabilizing means connected to said flexible means for guiding the swinging movement of said flexible means toward and away from said motion limiting means, said flexible means being moved by changes in upstream pressure.

14. A device for cotrolling fluid flow in an air conditioning passage or the like, said device having a path of flow therethrough comprising a swingable flexible curtain means movable in said path of flow, said curtain means being swingable about an axis, motion limiting means for said curtain means on the downstream side of said curtain means, said limiting means having air passage means therethrough, swingable movement stabilizing arm means connected to said curtain means, said arm means being swingable about an axis spaced from the axis of said curtain means for guiding the swinging action of said flexible means toward and away from said motion limiting means in a predetermined path, and baffle means on the upstream side of said curtain means providing substantially uniform distribution of air to said device, said curtain means being operated by changes in upstream pressure.

15. A device for controlling fluid flow in an air conditioning passage or the like, said device having a path of flow therethrough comprising a pair of swingable flexible curtain means movable in said path of flow, motion limiting means for each of said flexible curtain means, comprising perforated plates on the downstream side of said curtain means, said curtain means and limiting means cooperating to control the flow of air therethrough, and curtain movement stabilizing arm means connected to each of said curtain means for guiding the swinging movement of each curtain toward and away from said perforated plates to control the passage of air therethrough, said curtain means and arm means being operated by changes in upstream pressure.

16. A device for controlling fluid flow in an air conditioning passage or the like, said device having a path of flow therethrough comprising a pair of swingable flexible curtain means movable in said path of flow, motion limiting means for each of said flexible curtain means, comprising perforated plates on the downstream side of said curtain means, said curtain means and limiting means cooperating to control the flow of air therethrough, curtain movement stabilizing arm means connected to each of said curtain means for guiding the swinging movement of each curtain toward and away from said perforated plates to control the passage of air therethrough, and baffle means on either side of the passage adjacent the upstream side of said curtain means for distributing air thereto, changes in upstream air pressure operating said curtain means.

17. A device for controlling flow in an air conditioning passage or the like, said device having a path of flow therethrough, comprising a pair of swingable flexible curtain means movable in said path of flow, said curtain means being swingable about an axis, perforated plate means on the downstream side of each of said curtain means, said curtain means and plate means cooperating to control the flow of air, pivotally mounted movement stabilizing arm means connected to each of said curtain means at a location spaced from the axis of swinging of the curtain means for guiding the swinging movement of each of said flexible means toward and away from said perforated plates to control the passage of air therethrough, the pivotal mounting of the arm means being spaced from the axis of swinging of the curtain means, reciprocable rod means located between the swinging axes of said curtains, equalizing arm means pivotally connected to each of said arm means and to said reciprocable rod means, spring means connected to said reciprocable rod means exerting force thereon to tend to open said air passage means, block means slidably mounted on said reciprocable rod means, and spring means connected to said frame means and to said block means also urging said frame means and its respective curtain means in a direction to open said air passage means, increase of upstream air pressure tending to close said air passage means.

18. A device for controlling flow in an air conditioning duct or the like, said device having a path of flow therethrough, comprising a casing insertable in said duct, a pair of swingable flexible curtain means movable in said path of flow, said curtain means being hingedly mounted in said casing and swingable about an axis, angularly disposed perforated plate means on said casing on the downstream side of each of said curtain means, said curtain means and plate means cooperating to control the flow of air, pivotally mounted movement stabilizing arm means connected to each of said curtain means at a location spaced from the axis of swinging of the curtain means for guiding the swinging movement of each of said flexible means toward and away from said perforated plates to control the passage of air therethrough, the pivotal mounting of the arm means being on said casing and being spaced from the axis of swinging of the curtain means, reciprocable rod means located between the swinging axes of said curtains, said rod means being guided by said casing, equalizing arm means pivotally connected to each of said frame means and to said reciprocable rod means, adjustable spring means connected to said reciprocable rod means exerting force thereon to tend to open said air passage means, block means slidably mounted on said reciprocable rod means, and leaf spring means connected to said frame means and to said block means also urging said frame means and its respective curtain means in a direction to open said air passage means, changes in upstream air pressure operating said curtain means.

References Cited in the file of this patent

UNITED STATES PATENTS

| | | |
|---|---|---|
| 646,205 | Compton | Mar. 27, 1900 |
| 1,013,075 | Scott | Dec. 26, 1911 |
| 2,360,888 | Peple | Oct. 24, 1944 |
| 2,485,306 | Myers | Oct. 18, 1949 |
| 2,675,025 | Wynkoop | Apr. 13, 1954 |
| 2,787,288 | Shataloff | Apr. 2, 1957 |

FOREIGN PATENTS

| | | |
|---|---|---|
| 1,040 | Great Britain | Mar. 10, 1880 |
| 364,813 | Germany | Dec. 1, 1922 |
| 981,519 | France | Jan. 17, 1951 |
| 897,639 | Germany | Nov. 23, 1953 |

UNITED STATES PATENT OFFICE

CERTIFICATE OF CORRECTION

Patent No. 2,890,716 June 16, 1959

Ernest A. Werder

It is hereby certified that error appears in the printed specification of the above numbered patent requiring correction and that the said Letters Patent should read as corrected below.

Column 7, line 64, after "close" insert -- off --; column 8, line 8, for "cotrolling" read -- controlling --.

Signed and sealed this 20th day of October 1959.

(SEAL)
Attest:

KARL H. AXLINE
Attesting Officer

ROBERT C. WATSON
Commissioner of Patents